United States Patent [19]

Erskine

[11] 3,870,632

[45] Mar. 11, 1975

[54] TRAVELING FILTER FOR USE WITH FILTER MEDIUM INCINERATION PROCESS

[75] Inventor: Donald Baldwin Erskine, Coraopolis, Pa.

[73] Assignee: Calgon Corporation, Pittsburgh, Pa.

[22] Filed: Sept. 30, 1970

[21] Appl. No.: 76,788

[52] U.S. Cl.................. 210/67, 210/71, 210/80, 210/269
[51] Int. Cl............................................. B01d 37/00
[58] Field of Search............ 210/189, 269, 80, 400; 110/14

[56] References Cited
UNITED STATES PATENTS

| | | | |
|---|---|---|---|
| 984,646 | 2/1911 | Bois | 110/14 X |
| 2,027,475 | 1/1936 | Giraud | 210/189 X |
| 2,046,756 | 7/1936 | Thomas | 210/80 X |
| 2,197,770 | 4/1940 | Pruyn | 210/189 |
| 3,171,804 | 3/1965 | Rice | 210/53 |
| 3,333,694 | 8/1967 | Range | 210/189 X |
| 3,600,307 | 8/1971 | Kehoe et al. | 210/80 X |

*Primary Examiner*—John Adee
*Attorney, Agent, or Firm*—Harry E. Westlake, Jr.; Raymond M. Speer

[57] ABSTRACT

A traveling filter is disclosed which carries filter medium such as sand, for example, and a substance to be filtered, such as sewage, through a distance and time period sufficient to filter the sewage, after which the entire fouled filter medium mass is passed to a furnace for incineration. After incineration, in which most of the combustible material is burned off and the filter medium is left in a more or less unfouled condition, the filter medium is optionally screened, and then returned to re-use in the traveling filter.

4 Claims, 1 Drawing Figure

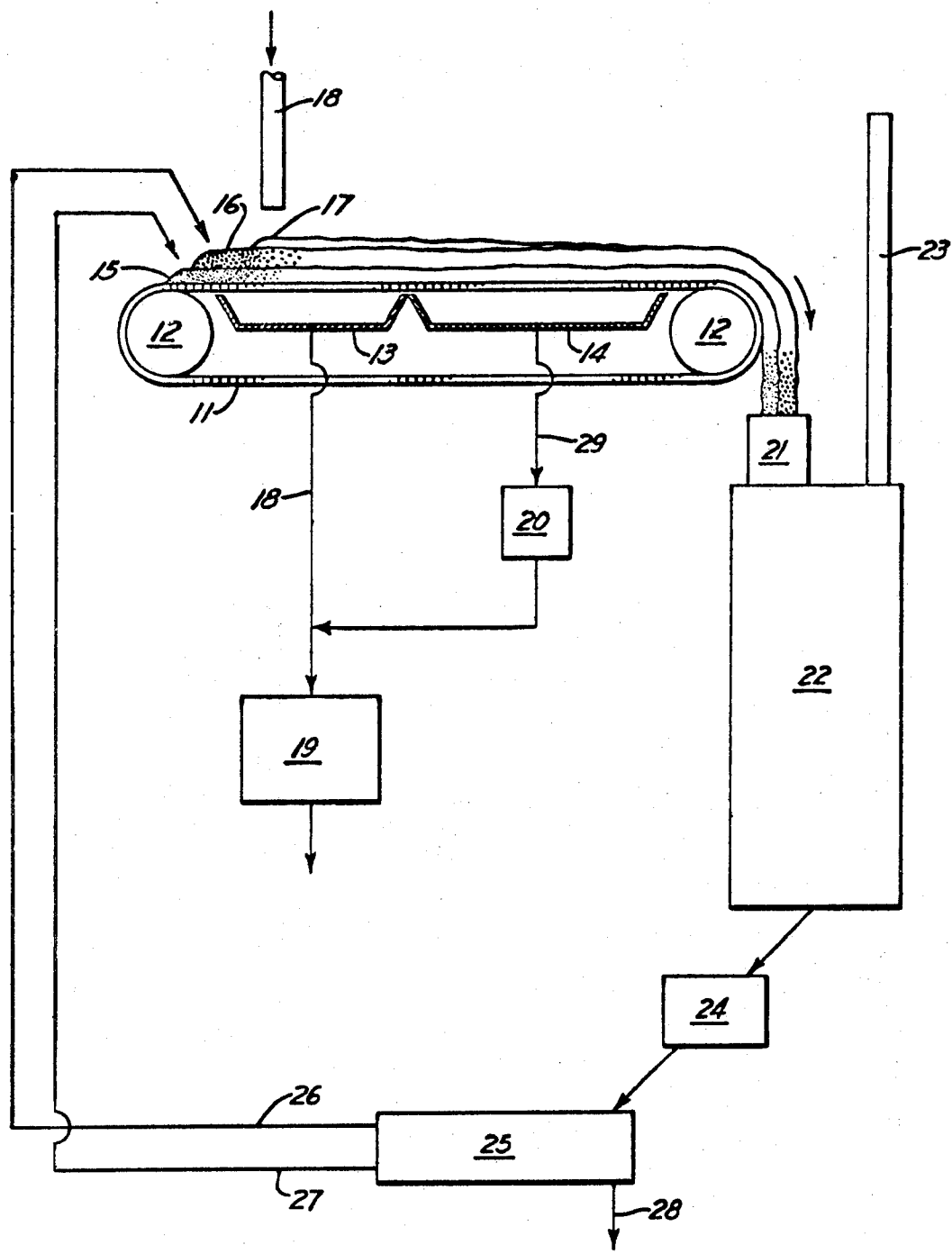

TRAVELING FILTER FOR USE WITH FILTER MEDIUM INCINERATION PROCESS

BACKGROUND OF THE INVENTION

Neither the incineration nor the filtration of waste materials is a new concept. However, the use of a traveling filter for sewage has been precluded by handling problems and expense. Nor has incineration been widely used in modern sewage treatment facilities, at least partly because of the dewatering problem. However, incineration has been recently proposed as a solution to the growing solid waste disposal problem. See Davis, U.S. Pat. No. 3,440,165, Bucksteeg et al. U.S. Pat. No. 3,480,542 and Bouthilet U.S. Pat. No. 3,244,621.

SUMMARY OF THE INVENTION

My invention comprises a traveling filter bed including means for supporting the bed and means for depositing the fouled filter medium in an incineration furnace, followed by an optional screening means for the filter medium and means for re-depositing the regenerated or incinerated filter medium on the traveling filter bed. My invention will be described in more detail with reference to the attached drawing.

Referring to the drawing, which is in more or less diagrammatic form, the endless traveling filter bed 11, which is stretched between mandrels 12, is a screen or other device providing holes at least sufficiently large for water to pass through. In traveling from left to right on the drawing, the screen passes over receptacles 13 and 14 which collect the effluent from the filter. Relatively fine sand employed as a filter medium is deposited continuously at 15. Relatively coarse sand also functioning as a filter medium is continuously deposited at 16. Raw sewage is conducted through conduit 18 and deposited on top of the relatively coarse sand 16 at point 17 more or less continuously. The traveling filter bed 11 carries the sand 15 and 16 and the sewage 17 across receptacles 13 and 14 and dumps them all into receptacle 21 of the furnace 22. By the time the sewage 17 has passed the full length of the filter, it has become completely filtered by the sand and has completely fouled the sand. In furnace 22, which has a vent 23, all of the combustibles, which comprise a very high percentage of the sewage solids are burned off, leaving the more or less clean filter medium which may be cooled in optional cooler 24 and then transferred to screen 25, which divides the filter medium into coarse and fine portions and which also may separate the small quantity of ash. The ash is sent to waste at 28 while the coarse and fine sand are returned through lines 26 and 27, respectively. They are then placed as before on the beginning of the traveling bed. Leading from receptacle 13 is a conduit 18 which takes the effluent from the filter to an optional polishing filter 19. Attached to receptacle 14 is an optional vacuum pump 20 which draws the effluent from receptacle 14 through line 29 and then into the polishing filter 19.

Thus, it may be seen that my invention comprises a filter bed of unoxidizable filter medium, means for collecting substantially liquid effluent from the filter bed, means for conducting fouled filter medium from the filter bed to a furnace, a furnace for burning off the combustibles in the filter medium, and means for conducting the cleaned, incinerated filter medium back to the filter bed. In a preferred form, the invention contemplates a continuous perforated belt support for holding the filter medium, the belt being moved on a pair of mandrels. The filter bed and its support do not need to be continuous — e.g., they may be sectional, modular or intermittent; however, in any case the support should be unoxidizable and reusable, and should be provided with means for cycling through the filter section and the incinerator. I also prefer to use more than one mesh size of sand, gravel and/or other filter medium which will not be damaged by the furnace. This requires the use of a screen to separate the mesh sizes after the filter medium has passed through the furnace.

I claim:

1. Method of treating sewage comprising placing an unoxidizable filter medium on a movable permeable support, depositing sewage on said filter medium, collecting substantially liquid effluent therefrom, withdrawing said support and depositing fouled filter medium in a furnace, incinerating the filter medium and sewage solids therein, recovering the filter medium, and replacing the filter medium on the moving support.

2. Method of claim 1 in which the filter medium is sand.

3. Method of claim 1 in which the moving permeable support is a perforated continuous belt.

4. Method of claim 1 in which the filter medium comprises a relatively coarse grade and a relatively fine grade and in which includes the steps of separating the fine medium from the coarse medium and placing the fine medium on the support surface and the coarse medium on top of the fine medium.

* * * * *